United States Patent [19]

Bürkert

[11] 3,768,819
[45] Oct. 30, 1973

[54] ELASTIC SEALING GASKET

[76] Inventor: Christian Bürkert, 7119 Ingelfingen, Germany

[22] Filed: Nov. 18, 1970

[21] Appl. No.: 90,586

[52] U.S. Cl............................................ 277/206 R
[51] Int. Cl............................................. F16j 15/32
[58] Field of Search............................ 277/206, 237

[56] References Cited
UNITED STATES PATENTS

| 2,528,895 | 11/1950 | Mathews | 277/206 |
| 2,889,183 | 6/1959 | Péras | 277/206 |
| 3,563,557 | 2/1971 | Doutt | 277/206 |

FOREIGN PATENTS OR APPLICATIONS

| 1,549,562 | 11/1968 | France | 277/206 |

OTHER PUBLICATIONS

Sealing Paints Free of Flash Eliminate Packing Ring Leakage by Harry & Wessel, Westinghouse Airbrake Co. Amer. Machinist Aug. 2, 1945 pp. 122, 123.

Primary Examiner—George E. Lowrance
Assistant Examiner—Robert I. Smith
Attorney—Edwin E. Greigg

[57] ABSTRACT

An elastic sealing gasket having a U-shaped cross section and comprising two spaced lips formed by the free terminus of the two legs of the U, and two sealing faces protruding from the base of the U away from the lips, and a recessed face separating said protruding sealing faces.

1 Claim, 1 Drawing Figure

Patented Oct. 30, 1973  3,768,819
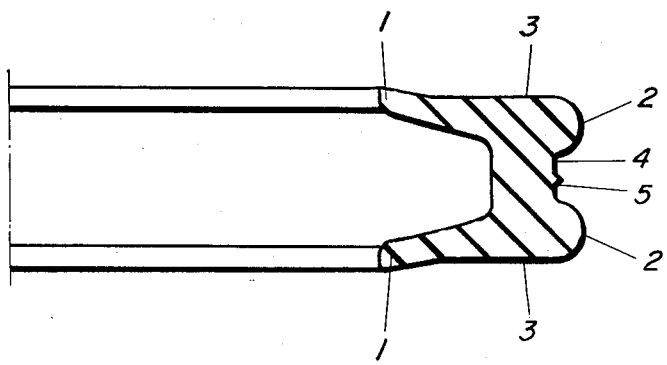

ELASTIC SEALING GASKET

This invention relates to an elastic sealing gasket usable in both static and dynamic environments. It is required of sealing gaskets of this type that they provide, even at low pressures, a reliable packing, that they resist high pressures, that they do not generate appreciable frictional forces during reciprocation or rotation of parts in contact therewith and that their wear be small. Furthermore, they should be inexpensive and should be manufacturable with up-to-date processes and equipment.

For such purposes there have been known, first of all, O-rings which are inserted, while compressed to a predetermined extent, into a packing groove or are slid on a shaft. There are further known lip rings or V-rings in which conical or outwardly projecting slender lips engage the surface to be sealed with a force resulting from their compression and are pressed thereagainst with a force proportionate to the pressure applied.

It is a disadvantage of O-rings that they have to be manufactured with relatively narrow tolerances and are to be inserted in grooves, depressions, etc. which also have to be made with samll dimensional deviations. The sealing effect, particularly at low pressures, occurs by virtue of their own compression, across the ring cross section. Any tolerance in the manufacture with respect to the sealing ring or the member in which it is received (shaft, bore, etc.) gives rise to a different pressure which affects the fluid tightness, friction or life expectancy. For this reason O-rings are used mostly as static, rather than dynamic sealing gaskets.

Lip rings or V-rings do not require such high precision for fitting. They are, however, much more expensive to make because the sealing lips generally have to be carefully sharpened. In addition, a normal lip ring works only in one direction, while it transmits any pressure directed at the back side of the lip.

In both types of sealing gaskets it is a common characteristic that the ridge which is a remnant of manufacture, has to be removed carefully. In case of an O-ring such a ridge is usually disposed on the sealing face of the ring.

More recently, elastomers are, in an increasing number, no longer pressed in forms and vulcanized, but are manufactured with an injection molding process, wherein the gasket material is injected through a nozzle of an auger-type machine into two-part molds.

It is an object of the invention to provide an improved sealing gasket which is inexpensive to manufacture, which has no stringent requirements with regard to fitting and which provides a reliable seal at both small and large pressures.

Briefly stated, according to the invention, there is provided an elastic sealing gasket of U-shaped cross section which is profiled in such a manner that there are provided two spaced sealing projections or elevations separated by a flat, recessed face. The plane separating the mold halves in which the gasket is made, extends preferably normal to the said recessed face.

In order to ensure that the sealing gasket according to the invention satisfactorily seals even at low pressures and large tolerances, it might be advantageous to spread or taper the U-shaped sealing lips in a known manner.

It is a particular advantage of the sealing gasket according to the invention that the gaskets which may be manufactured by injection in multi-part molds, may be very easily rendered ridgeless and may be inserted in grooves, depressions, etc. which may be dimensioned with large tolerances. At small pressures the gasket seals by virtue of the force exerted by its own biased condition, whereas at larger pressures, the force of the sealing gasket exerted is proportional to the pressure applied.

The sole FIGURE is a sectional view of the preferred embodiment along a radial plane that contains the gasket axis.

The sealing gasket, which has a generally U-shaped cross section, has two spaced identical lips 1, which extend slightly concially outwardly away from one another and which may engage the walls of a packing groove which is somewhat narrower than the lip-to-lip distance. It is seen that the lips 1 are formed by the free terminus of the two legs of the U. From the base of the U there bulge outwardly and away from the lips 1, sealing faces 2, separated by a recessed face 4. When viewing the gasket in cross section, it will be observed, that each sealing face 2 starts from an outer face 3 and, extending in a convex manner away from lips 1, terminates in the recessed face 4 which is planar in cross section. The ridge 5 which runs along the middle of peripheral face 4 and which is formed in the plane dividing the mold halves, may be easily trimmed without thereby affecting the sealing faces. It is thus seen that the plane of symmetry related to the cross section of the gasket is normal to face 4 and intersects the latter along a line which halves the distance between the two sealing faces 2.

Circular sealing gaskets having radially outwardly directed sealing protrusions as shown in the FIGURE, may be inserted, for example, in circumferential grooves of a piston which is to reciprocate in a cylinder in a fluidtight manner. It is to be understood that a like arrangement is possible in which the aforenamed protrusions face radially inwardly if a reverse sealing effect is to be obtained.

The sealing gasket, in its overall appearance, may be circular as shown, oval, even linear, or may have any other shape.

What is claimed is:

1. A molded elastic sealing ring having a generally U-shaped cross section comprising,
  a body portion having a flat upper face and a flat lower face parallel to said upper face,
  a first leg portion projecting radially from the upper part of the body and a second leg portion projecting radially from the lower part of the body, said leg portions being spaced apart and projecting in the same radial direction,
  a first leg portion terminating in a slightly outwardly extending lip part and the second leg portion terminating in a slightly outwardly extending lip part, said lip parts diverging from each other,
  a first convex part projecting radially from the upper part of said body portion in a direction opposite to that of the first leg portion and a second convex part projecting radially from the lower part of the body portion in a direction opposite to that of the second leg portion, said convex parts being spaced apart and merging tangentially into the upper and lower faces of the body portion,
  the side of the body portion between the convex parts forming a recess, and
  a ridge formed by the molding operation being located in said recess.

* * * * *